US006978735B1

(12) United States Patent
Yeager

(10) Patent No.: US 6,978,735 B1
(45) Date of Patent: Dec. 27, 2005

(54) ARTIFICIAL FISH HABITAT

(76) Inventor: Ricardo Donavan Yeager, 16319 W. 124th St., Olathe, KS (US) 66062

( * ) Notice: Subject to any disclaimer, the term of this patent is extended or adjusted under 35 U.S.C. 154(b) by 0 days.

(21) Appl. No.: 10/924,408

(22) Filed: Aug. 24, 2004

(51) Int. Cl.[7] .......... A01K 61/00
(52) U.S. Cl. .......... 119/221; 119/223; 405/27
(58) Field of Search .......... 119/221, 222, 223; 405/27

(56) References Cited

U.S. PATENT DOCUMENTS

| | | | | |
|---|---|---|---|---|
| 3,675,626 A * | 7/1972 | Down | 119/238 |
| 3,738,318 A * | 6/1973 | Woodbridge et al. | 119/238 |
| 4,027,486 A * | 6/1977 | Dougherty | 405/27 |
| 4,130,994 A * | 12/1978 | Van Moss, Jr. | 405/24 |
| 4,312,296 A * | 1/1982 | Stelleman et al. | 119/223 |
| 4,316,431 A * | 2/1982 | Kimura | 119/221 |
| 4,441,453 A | 4/1984 | McMickle et al. | |
| 4,744,331 A * | 5/1988 | Whiffin | 119/223 |
| 4,916,845 A * | 4/1990 | Aydelette, Sr. | 43/4 |
| 4,993,362 A * | 2/1991 | Jimbo | 119/221 |
| 5,109,796 A | 5/1992 | Monus | |
| 5,201,136 A | 4/1993 | LaMorte et al. | |
| 5,238,325 A * | 8/1993 | Krenzler | 405/21 |
| 5,299,530 A * | 4/1994 | Mukadam et al. | 119/223 |
| 5,315,779 A | 5/1994 | Fussell | |
| 5,549,076 A * | 8/1996 | Kaarstad | 119/223 |
| 5,970,917 A * | 10/1999 | Keith, Jr. | 119/223 |
| 6,089,191 A * | 7/2000 | Calinski et al. | 119/221 |
| 6,824,327 B1 * | 11/2004 | Walter | 405/33 |

FOREIGN PATENT DOCUMENTS

| | | |
|---|---|---|
| JP | 405049367 A * | 3/1993 |
| WO | WO/ 87/03170 A1 * | 6/1987 |

* cited by examiner

*Primary Examiner*—Yvonne R. Abbott
(74) *Attorney, Agent, or Firm*—Hovey Williams LLP

(57) ABSTRACT

An artificial fish habitat (10) comprises an open framework (12) including a plurality of layers (14). The layers (14) each include an open portion (20) and are generally aligned so that the open portions (20) cooperate to define a passageway (26) through the framework (12) for fish to reside therein. Each layer (14) includes a periphery section (18) which is formed from a material presenting a minimum cross section sized and configured to be greater than the gap spacing of a conventional fish hook such that the hook may not snag on the framework (12). A method of utilizing the partially submerged habitat (10) comprises descending a hook through the passageway (26) to contact a layer (14) and withdrawing the hook without snagging.

19 Claims, 12 Drawing Sheets

ARTIFICIAL FISH HABITAT

BACKGROUND OF THE INVENTION

1. Field of the Invention

The present invention relates generally to fish habitats. More specifically, the present invention concerns an artificial fish habitat including an open framework formed from periphery sections having a minimum cross section sized and configured to be greater than a gap spacing of a fish hook.

2. Discussion of Prior Art

Recreational fishing is a popular past-time enjoyed by many individuals who fish for fresh or saltwater fish in a variety of environments. Individuals who fish have long understood that fish prefer certain habitats. Prior art fish habitats have been developed to provide fish with a habitat in and around which a substantial number of fish will congregate. Individuals who fish benefit from utilizing habitats as the chance of catching a fish increases with the number of fish in proximity to the individual. A preferred prior art fish habitat of many individuals is a pine or cedar tree, such as those once utilized as Christmas trees. For example, individuals often deposit these leftover pine or cedar trees in convenient fishing locations, such as near docks, to provide a habitat for crappie and other desirable fish. The crappie and other desirable fish eventually congregate within the many branches of the trees and the individual may fish for the crappie and other desirable fish from the convenient fishing location.

Unfortunately, prior art fish habitats, including pine and cedar trees, routinely snag fish hooks and thereby severely limit the beneficial aspects of the fish habitat and convenient fish location. Specifically, pine or cedar trees include a plurality of small branches, including many branches having a cross-sectional areas smaller than one-quarter inch, which are easily snagged by conventional fish hooks. For example, most conventional fish hooks, including a #3 fish hook commonly utilized to fish for crappie, have a gap spacing which is substantially larger than one-quarter inch and which may easily snag on the many branches of a pine or cedar tree. Thus, individuals who fish within these prior art fish habitats often spend more time replacing snagged hooks and broken lines than catching fish.

Additionally, prior art fish habitats, specifically pine and cedar trees, are not water-resistant and decompose over time when submerged in water. For instance, pine and cedar trees will lose branches, bark, and other parts over time due to being continuously submerged in water, which pollutes the areas surrounding the habitat and often renders the surrounding areas unusable for other purposes, such as boating or swimming. Additionally, the decomposed pine and cedar trees do not provide an optimum habitat for fish and must be undesirably be regularly replaced. Thus, an individual who utilizes a pine or cedar tree for a fish habitat must expend the effort and time required to transport a potentially large and cumbersome pine or cedar tree to a convenient fish location and also risks losing the convenient fish location for other purposes due to the pollution created by the pine or cedar tree.

Other prior art fish habitats have also been developed which use artificial materials in place of pine or cedar trees. However, these other prior art fish habitats also routinely snag fish hooks and generally fail to provide an adequate habitat for most fish. For example, these habitats lack sufficient cover for fish, such as that provided by the many branches of pine and cedar trees in which fish often prefer to reside. Additionally, fish habitats often substantially rest on the bottom of a body of water where many fish species do not reside due to environmental concerns such as temperature requirements or predatory instincts. Thus, many of these other prior art fish habitats are useless as they are ignored by desired fish species.

Accordingly, there is a need for improved fish habitat which does not suffer from the problems and limitations of the prior art.

SUMMARY OF THE INVENTION

The present invention provides an improved fish habitat that does not suffer from the problems and limitations of the prior art discussed above. The improved fish habitat may be utilized by an individual without the risk of snagging a fish hook on the habitat. Additionally, the habitat provides a buoyant open framework in which fish may reside and water may pass through.

A first aspect of the present invention concerns an artificial fish habitat for placement in a body of water and fishing in and around with a hook having a gap spacing. The habitat broadly includes an open framework including a plurality of layers. Each of the layers include an elongated periphery section that generally defines an internal substantially open portion adapted for fish to pass through. At least a portion of each of the layers are spaced from one another and are generally aligned so that the open portions may cooperate to define a passageway through the framework. Each of the periphery sections is substantially formed from a material presenting a minimum cross section sized and configured to be greater than the gap spacing of the hook.

A second aspect of the present invention concerns a method of fishing in a body of water with a fish hook having a gap spacing. The method includes submerging at least a portion of an artificial fish habitat in the body of water. The artificial fish habitat generally includes a plurality of spaced layers each defining an open portion such that the open portions cooperate to define a vertical passageway through the habitat. The method further includes descending the fish hook substantially through the passageway into the habitat, contacting at least one of the layers with the hook, and withdrawing the hook from the passageway without snagging the hook on the habitat.

In a preferred embodiment, the fish habitat includes an open framework which is comprised of plurality of layers. The layers are arranged to provide at least one passageway for fish to pass through. Each layer comprises of a periphery section which is formed from a plurality of PVC tubing segments. The PVC tubing segments are sealed such that the periphery sections are hollow. The sealed periphery sections provide buoyancy to the framework to enable the framework to float above the bottom of a body of water.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein.

DETAILED DESCRIPTION OF THE PREFERRED EMBODIMENTS

Figure 1:
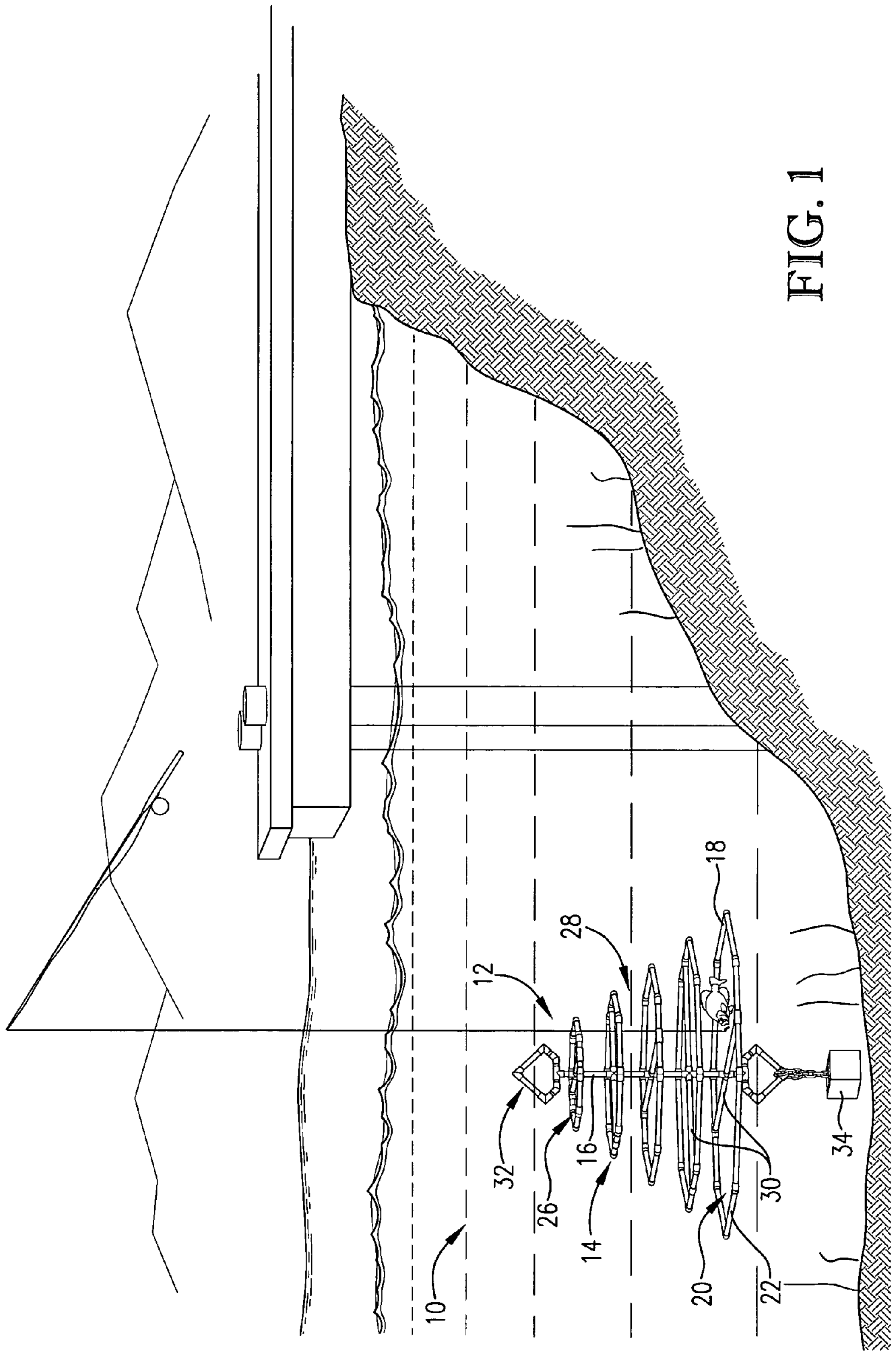
FIG. 1 is a perspective view of an artificial fish habitat constructed in accordance with the principles of a first preferred embodiment of the present invention, and shown in use submerged in a body of water with a fish hook descended through one of the passageways.
Figure 3:
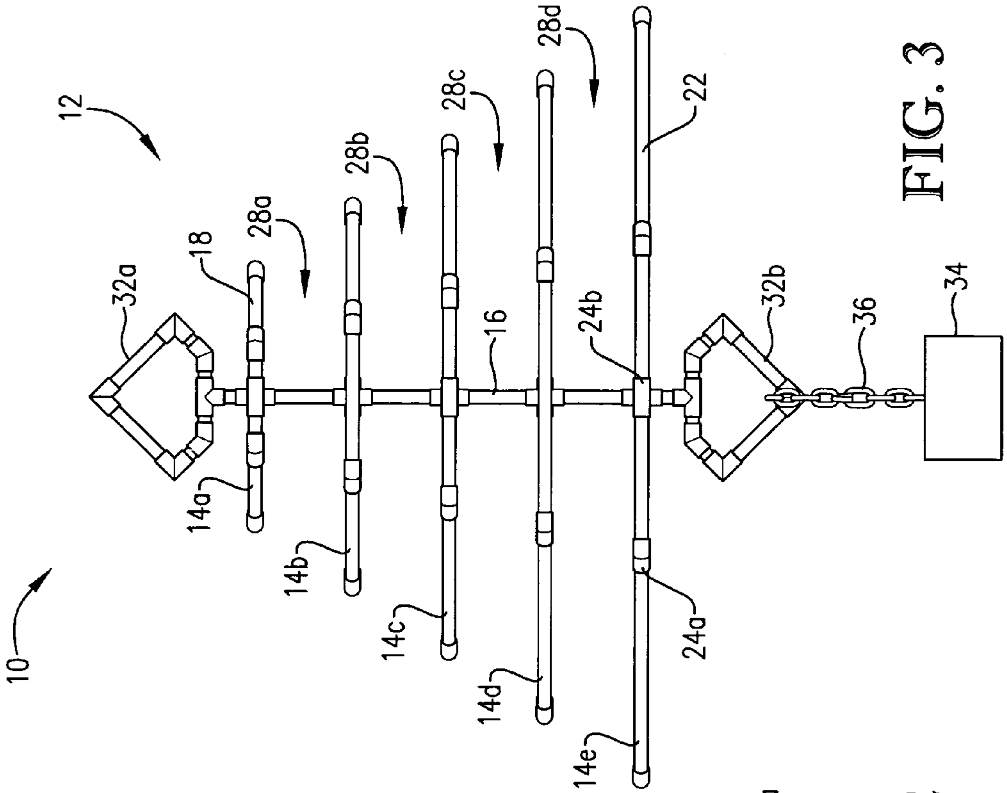
FIG. 3 is a front elevational view of the artificial fish habitat illustrated in FIGS. 1–2.
Figure 2:
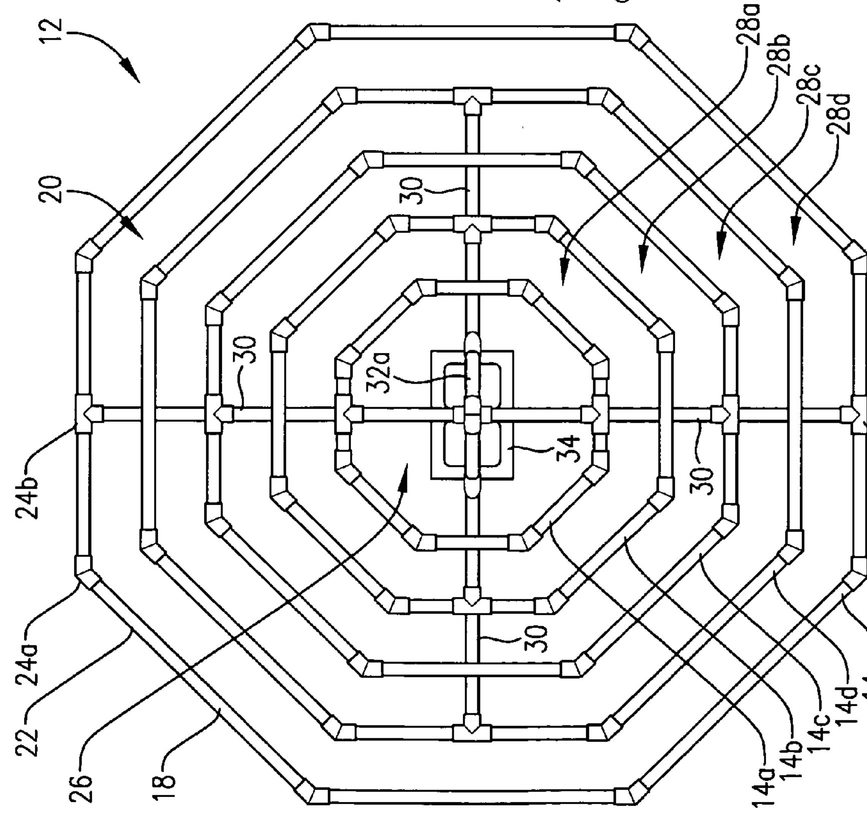
FIG. 2 is a top view of the artificial fish habitat illustrated in FIG. 1.
Figure 5:
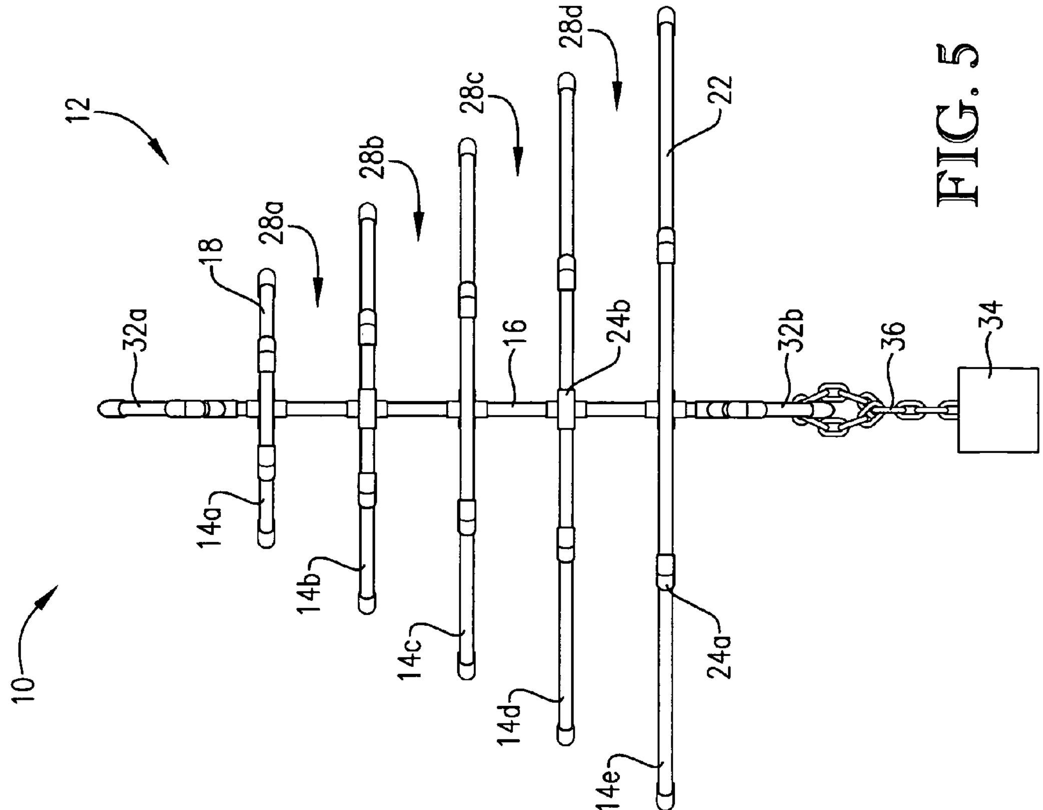
FIG. 5 is a side elevational view of the artificial fish habitat illustrated in FIGS. 1–4.
Figure 4:
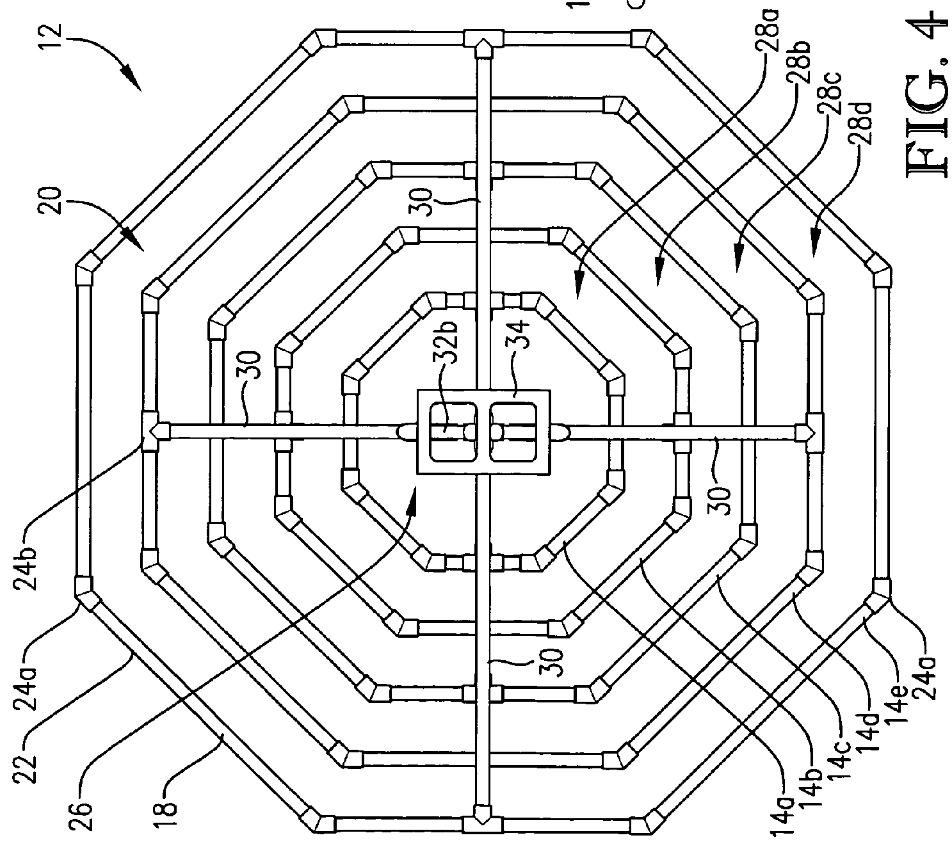
FIG. 4 is a bottom elevational view of the artificial fish habitat illustrated in FIGS. 1–3.
Figure 6:
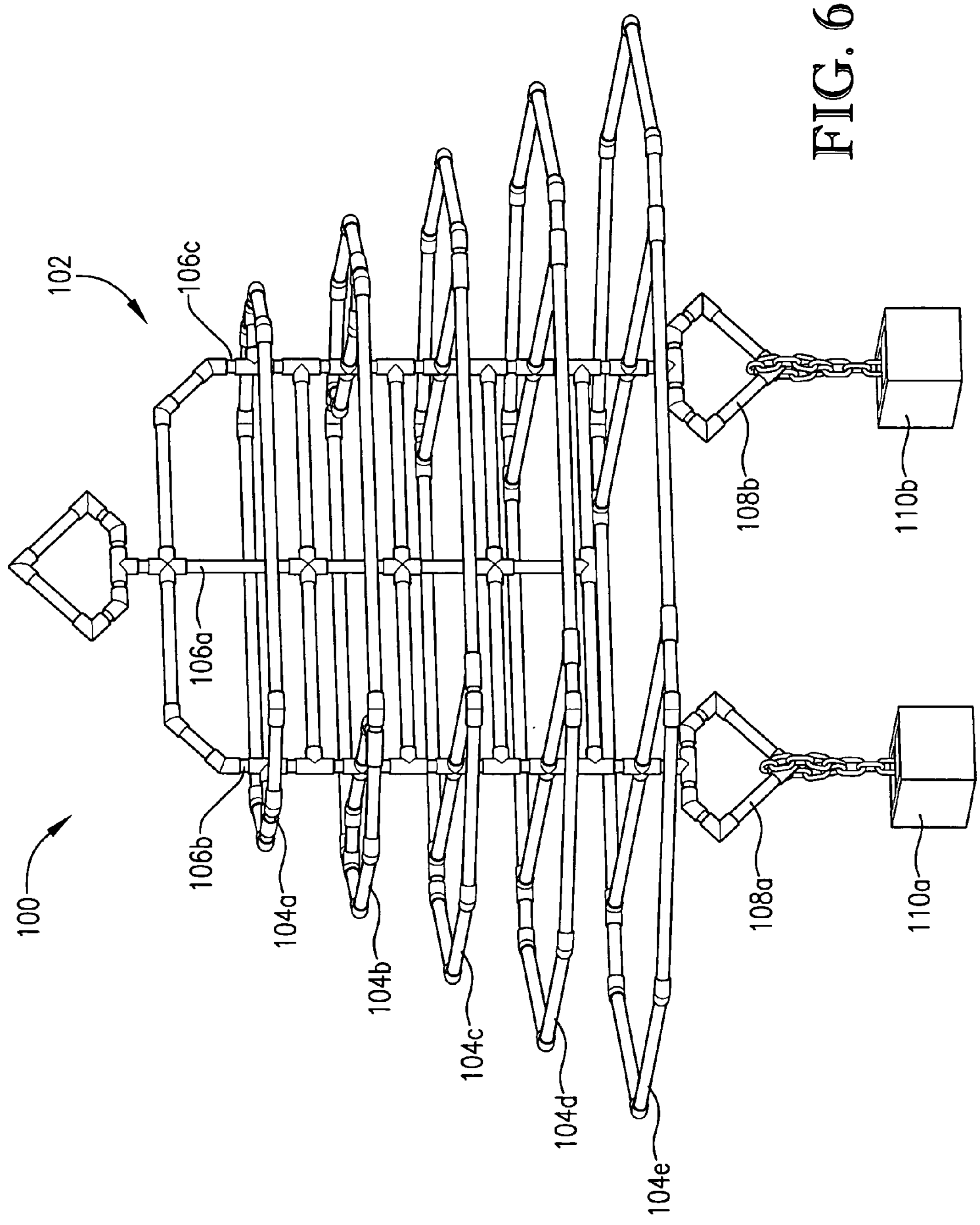
FIG. 6 is a perspective view of an artifical fish habitat constructed in accordance with the principals of a second preferred embodiment of the present invention.
Figure 7:
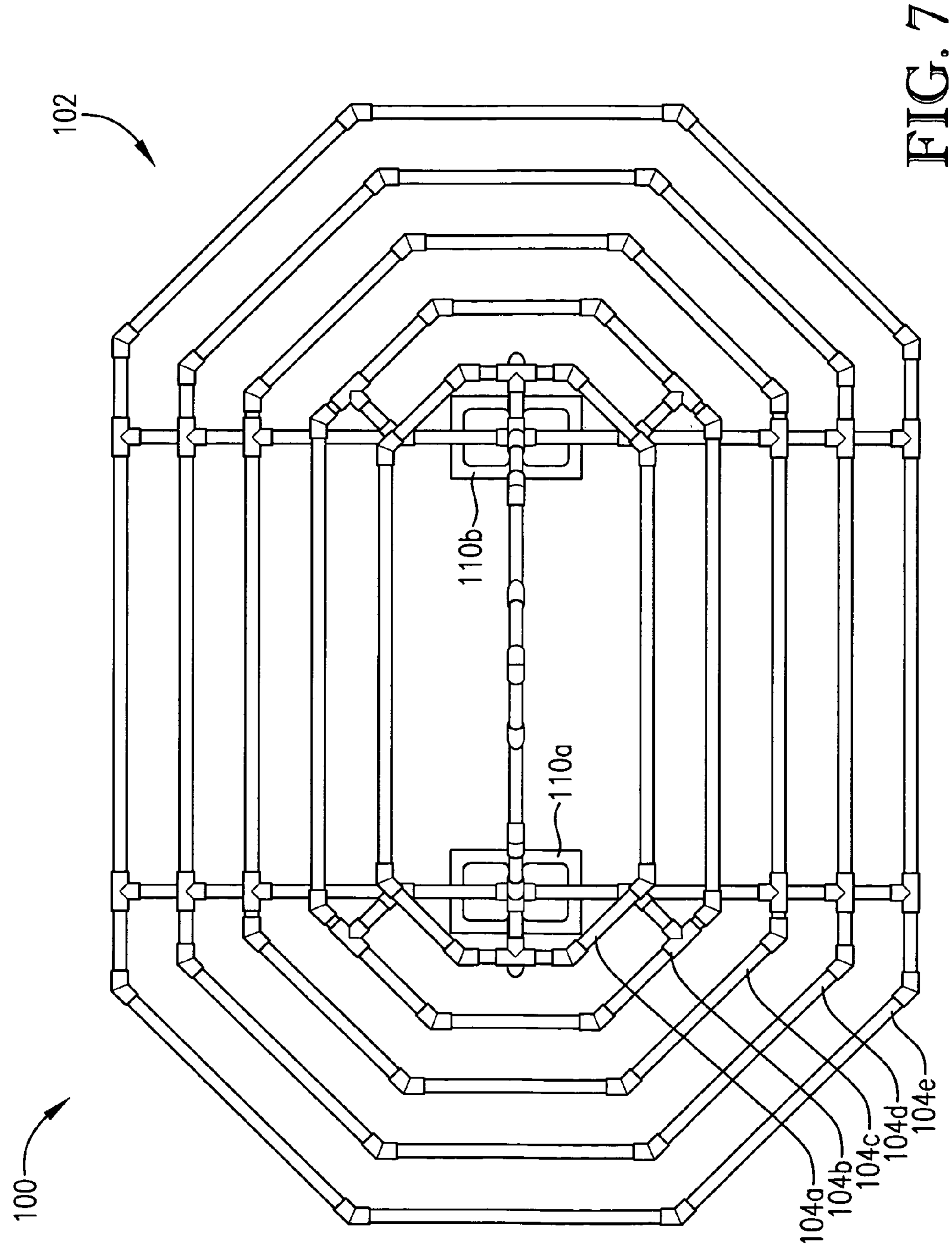
FIG. 7 is a top view of the artificial fish habitat illustrated in FIG. 6.
Figure 8:
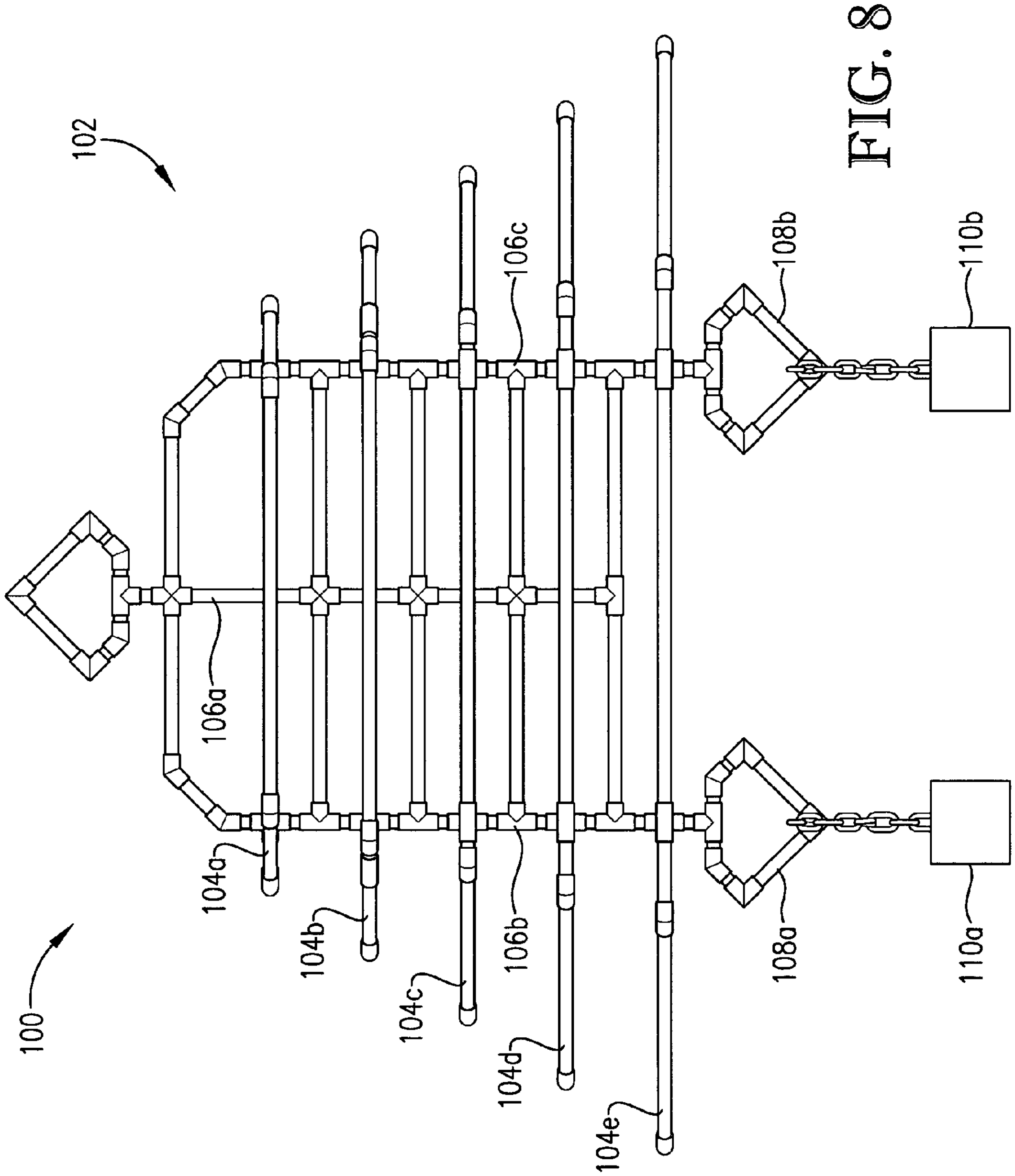
FIG. 8 is a front elevational view of the artificial fish habitat illustrated in FIGS. 6–7.
Figure 9:
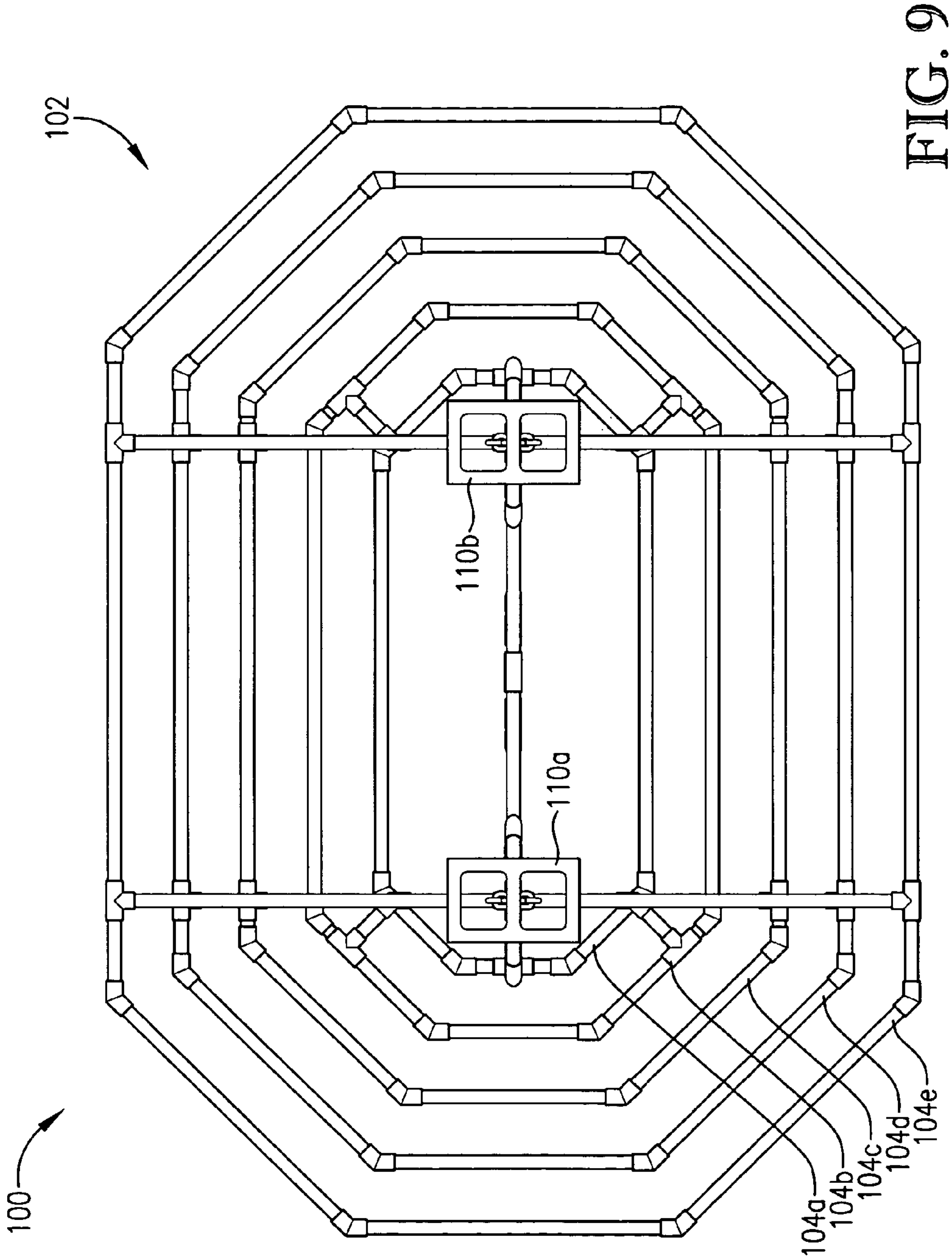
FIG. 9 is a bottom elevational view of the artificial fish habitat illustrated in FIGS. 6–8.
Figure 10:
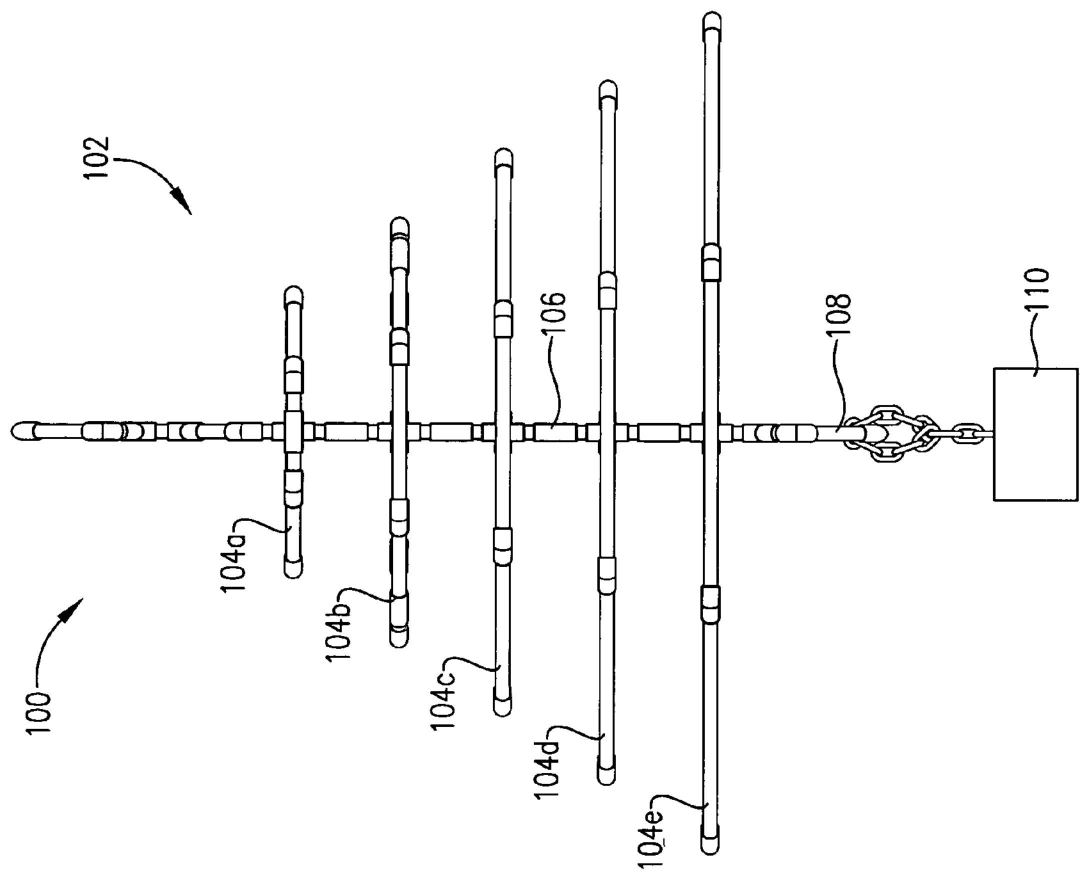
FIG. 10 is a side elevational of the artificial fish habitat illustrated in FIGS. 6–9.

FIG. 1 illustrates a fish habitat 10 constructed in accordance with the principles of a preferred embodiment of the present invention. The habitat 10 is configured for placement within a body of water to provide an environment for fish or other aquatic life. The habitat 10 additionally facilitates fishing for fish and other aquatic life and may be utilized in any body of water, including ponds, lakes, streams, rivers, oceans, etc. In a preferred embodiment, the habitat 10 is utilized in a lake to provide an environment suitable for crappie. Additionally, while the habitat 10 is illustrated in proximity to a dock and a shore, the habitat 10 may be utilized in any portion of the body of water, including shallow and deep portions, and in fully submerged and partially submerged configurations.

Turning now to FIGS. 1–5, a first preferred embodiment of the present invention is illustrated generally comprising a habitat 10 including an open framework 12. The framework 12 is open such that water, fish, and other aquatic life may easily pass into, through, and around the framework 12. The framework 12 preferably presents a substantially uniform shape such as a pyramid or a cube. For example, the framework 12 illustrated in FIGS. 1–5 presents a pyramidal appearance to mimic the shape and contour of a pine or cedar tree. However, the framework 12 may present any appearance and have a non-uniform shape. As described in more detail below, the framework 12 is preferably buoyant such that the framework 12 is operable to float in the body of water and is water-resistant such that the habitat 10 and framework 12 are not damaged by use and submersion in the body of water.

The framework 12 includes a plurality of layers 14 and a supporting member 16 which supports and spaces the layers 14 within the framework 12. As shown in FIGS. 1–5, the spaced layers 14 enable the framework 12 to be open, as described above, and provide the framework 12 with its substantially uniform pyramidal shape. Preferably, the habitat 10 includes at least five layers **14*a*, 14*b*, 14*c*, 14*d*, and 14*e* as illustrated in FIGS. 2–5, however any number of layers 14** may be utilized, including a single layer, depending on the desired habitat construction and the needs of the particular body of water. For instance, in a deep body of water, such as a lake or ocean, a larger number of layers may be desired, while in a shallow body of water, such as a stream or pond, a smaller number of layers may be desired.

Each layer 14 preferably presents a generally uniform shape. For instance, each layer 14 may present a circular shape, a square shape, a polygonal shape, an octagonal shape, etc. For example, the layers 14 of the first preferred embodiment illustrated in FIGS. 1–5 present an octagonal shape. Alternatively, the layers 14 may present a non-uniform shape, such that each layer 14 presents a different shape or that all layers 14 do not present the same shape.

Each layer 14 includes at least one elongated periphery section 18 which defines an internal substantially open portion 20 adapted for fish to pass through. The open portion 20 corresponds to an open area within each layer 14 and not an open area within the periphery sections 18, as described in detail below. The layers 14 are generally flat such that all periphery sections 18 for a given layer 14 substantially reside in the same horizontal plane relative to the surface of the body of water. However, other embodiments of the present invention may include non-flat layers, as described below.

The minimum diameter of the open portion 20 is sufficient in size to allow fish to pass through. Preferably, the open portion 20 presents a substantially greater area than the periphery section 18 such that the periphery section 18 of each layer 14 is small in comparison to the total size of the layer 14. For example, the habitat 10 illustrated in FIGS. 1–5 includes periphery sections 18 being at least one-half inch in cross section, as described below in detail, and open portions 20 having a diameter of at least approximately one foot. However, the open portion 20 may be of any size and configuration provided that a fish or a hooked fish may pass through.

The periphery section 18 is preferably formed in substantial part from a durable, water-resistant, and buoyant material. The material is durable such that it may remain submerged in potentially inclement water conditions without damage and resists being easily or inadvertently punctured or impaired by a sharp fish hook. Additionally, the material does not pollute or otherwise negatively environmentally impact the body of water as the durable and water-resistant material does not decompose or easily break up when submerged for extended periods of time.

Preferably the material comprises a plurality of plastic tubes 22 such as conventional polyvinyl chloride (PVC) tubes. The tubes 22 are interconnected in any suitable manner known in the art, such as with glue, activator, clamps, etc. The illustrated tubes 22 are interconnected with conventional connectors 24, including elbows 24*a* and/or T-connectors 24*b*. However, whatever method is utilized preferably interconnects the tubes 22 so that the resulting periphery sections 18 are generally sealed. In this regard, the preferred tubes 22 are hollow and when sealingly interconnected facilitate the buoyancy of the framework 12. However, the tubes 22 may be a solid foam or solid plastic tube which also provides the desired structure and buoyancy to the framework 12.

In the illustrated habitat 10, the material presents a minimum cross section sized and configured to be greater than a gap spacing of the fish hook. As is known the art, the gap spacing is the distance between a hook's protruding point and a hook's elongated shank. As is also known in the art, the size of a fish hook, including its gap spacing, is identified by a number, generally from 1 to 8, with 1 having the greatest gap spacing and 8 having the smallest gap spacing. For example, a #1 fish hook has a gap spacing of approximately 0.47 inch, a #3 fish hook has a gap spacing of approximately 0.4 inch, a #4 fish hook has a gap spacing of approximately 0.35 inch, a #6 fish hook as a gap spacing of approximately 0.31 inch, etc.

When the material presents a minimum cross section that is greater than the gap spacing of a particular hook, the particular hook cannot snag or otherwise inadvertently couple with the material, layer 14, framework 12, or habitat 10. For example, in the illustrated habitat 10, the material is comprised of half-inch PVC tubing, such that the hollow material has a half-inch inner diameter and about a three-quarter inch outer diameter, thereby presenting a cross section greater than about one-half inch. In this regard, a #1 fish hook, or any hook having a smaller gap spacing such as a #3 hook, cannot snag or otherwise inadvertently couple with the half-inch PVC tubing as the gap spacing of the #1 hook is smaller than a half inch.

However, it will be appreciated that due to the pliable nature of conventional fish hooks, a hook having a diameter less than a material's minimum cross section may still occasionally snag the material due to the bending of the hook caused by an applied force which increases the gap spacing of the hook. For example, the force generated from an individual reeling in a #1 hook and contacting the material may be sufficient to bend the hook and increase its gap spacing to an amount greater than a half-inch. Thus, the material preferably presents a minimum cross section that is substantially greater the gap spacing of a desired hook, such as utilizing half-inch PVC tubing as the material with a #3 fish hook to prevent a #3 fish hook from bending and increasing its gap spacing to an amount equal to the minimum cross section of the material. Similarly, materials other than half-inch PVC tubing may be utilized to present other minimum cross sections, including cross sections which specifically correspond to other hook sizes, such as utilizing three-quarter or one inch PVC tubing as the material with a #1 fish hook.

The layers 14 are spaced from one another and generally aligned by the supporting member 16, as described below, so that the open portions 20 cooperate to define a passageway 26 through the framework 12. The passageway 26 substantially fills with water when the framework 12 is submerged to provide a location for fish or other aquatic life to reside. In the illustrated preferred embodiments the passageway 26 extends generally transverse to the layers 14 such that the passageway 26 is substantially vertical relative to the surface of the body of water when the habitat 10 is placed therein. However, the passageway 26 may extend in any direction or orientation through the habitat 10.

Preferably, the open portions 20 are generally aligned so that fish may pass through the entire passageway 26. As shown in FIGS. 1–5, the open portions 20 of each layer 14 are substantially aligned such that the passageway 26 is substantially vertical relative to the surface of the body of water and extends through each layer 14 to allow a fish or a fish hook to pass through the entire passageway 26. The passageway 26 and generally pliable layers 14 enable a hooked fish to be pulled or forced through the framework 12 towards the surface. However, similar configurations may be utilized including segmented passageways which do not allow a fish or other elements to pass through their entire length. The passageway 26 may also be sized and configured for the passage of specific fish species, such as utilizing a larger passageway for larger fish and a smaller passageway for smaller fish. The passageway 26 may also include portions of layers 14, supporting member 16, periphery sections 18, or other portions of the framework 12 or habitat 10, as described below, such that the passageway 26 includes portions of the habitat 10 in addition to water when submerged.

The layers 14 are spaced from one another by the supporting member 16, as described below in detail, such that spacing 28 is created between each layer 14 to create the desired open framework 12. Particularly, in the illustrated habitat 10, each pair of adjacent layers 14*a* and 14*b*, 14*b* and 14*c*, 14*c* and 14*d*, 14*d* and 14*e* are separated by corresponding 28*a*, 28*b*, 28*c*, and 28*d*, respectively. The spacing 28 allows water to flow into the framework 12 between each layer 14 such that the water may easily pass in and out of the framework 12. As a result of the generally uninhibited flow of water through the framework 12, water residing in the passageway 26 and other portions of the habitat 10 is not stagnant or otherwise unhealthy or undesirable for the habitation of fish, which increases the likelihood that a desired fish species will reside therein. Additionally, the spacing 28 allows fish and other aquatic life to easily enter the habit in a natural manner, without requiring the fish to swim into the habit 10 and passageway 26 from a single isolated entry location thereby further increasing the likelihood that a desired fish species will reside therein.

The spacing 28 between each layer 14 also enables a fish hook to enter the passageway 26 at a variety of locations along the framework 12, such that the fish hook need not be delicately and intricately entered in a single isolated habitat entry location. For example, as illustrated in FIGS. 1–5, the layers 14*a–e* are spaced such that the fish hook may easily enter any of the spacing 28*a–d* between the layers, and the open portions 20 are aligned such that the fish hook may enter the passageway 26 from any direction or orientation. Thus, the spacing 28 facilitates the entry of fish and a fish hook into the habitat 10 and passageway 26 to enable an individual to easily fish within the habitat 10 from directly above the habitat or from any other angle.

Each layer 14 also presents a diameter. In preferred embodiments, the diameter of each layer 14 varies such that each layer 14*a–e* presents a different diameter. The layers 14 having varying diameters may be concentrically aligned from smallest diameter to largest diameter to present the desired pyramidal shape. Specifically, layers 14*a–e* of the first preferred embodiment illustrated in FIGS. 1–5 present corresponding diameters varying from approximately one foot to approximately five feet, respectively, and are arranged in order from smallest layer 14*a* to largest layer

14*e*, where the smallest layer 14*a* is closest to the surface of the water such that the habitat 10 presents a generally pyramidal shape.

The supporting member 16 is preferably elongated and extends generally parallel to the passageway 26. As illustrated in FIGS. 1–5, the supporting member 16 and passageway 26 may be coaxial. The supporting member 16 is also preferably comprised of the same material as the periphery section 18, such as PVC tubing, and provides support to the framework 12 and layers 14 to enable the framework 12 to withstand possible inclement conditions encountered while submerged in the body of water, such as strong current or impact from various objects including a hooked fish or other debris. The illustrated supporting member 16 includes a plurality of four-way cross connectors that facilitate coupling the support member 16 relative to the periphery sections 18 of the layers 14*a–e*. Although the illustrated supporting member 16, once assembled in the framework 12, is permanently affixed relative to the layers 14*a*–14*e*, the supporting member could alternatively be removable (e.g., threadably coupled in the framework, etc.) to allow the framework and other habitat elements to be disassembled for easy transport in a vehicle, such as a boat or car, and for easy storage.

The supporting member 16 and each layer 14*a–e* are coupled together by respective coupling members 30 to provide the desired spacing 28 and open framework 12. The coupling members 30 are preferably comprised of the same material as the periphery sections 18 and supporting member 16, such as PVC tubing. As shown in FIGS. 1–5, and specifically FIG. 4, each coupling member 30 preferably couples with the corresponding layer 14 by attaching to opposite and centrally-positioned periphery sections 18 of the respective layer 14*a–e* and extending between the opposed sections across the open portion 20. Thus, each coupling member 30 is aligned across a central axis of each layer 14 to provide support to each layer and a location for coupling with the supporting member 16. Preferably, the supporting member 16 couples with each coupling member 30 at the center of the coupling member 30 to provide strength and stability to the framework 12. However, the supporting member 16 and coupling members 30 may be coupled in any configuration.

The framework 12 additionally includes at least one mounting element 32 to allow the framework 12 to be easily carried by the individual and which additionally allows the framework 12 to be coupled with a non-buoyant load 34, such as a cinder block. Preferably, a proximate mounting element 32*a* is positioned at a proximate end of the supporting member 16 to allow the individual to carry the habitat 10 in an upright position or to facilitate lowering the habitat 10 into the water. A distal mounting element 32*b* is positioned at a distal end of the supporting member 16 to allow the non-buoyant load 34 to be coupled with the framework 12 such that the framework 12 will float in a desired upright position when submerged, as described below.

Each mounting element 32 is preferably comprised of the same material as the rest of the framework 12, such as PVC tubing. The mounting element 32 is preferably coupled with the non-buoyant load 34 through a link 36, such as a length of chain, wire, cable, rope, or other durable and water-resistant material, such that the framework 12 and non-buoyant load 34 are separated to allow the framework 12 to float above the non-buoyant load 34. The link 36 is most preferably not-rotting rope; however, other links will suffice so long as they are light enough to enable the framework 12 to float above the load 34. Additionally, if chain, wire, or cable is used, it is preferably resistant to rust, or includes a rust-resistant coating. The link 36 may have a varying length to allow the framework 12 to float a desired distance above the non-buoyant load 34. For instance, lake bottoms often include a few inches, or in some cases a few feet, of loose sediment in which placement of the habitat 10 is undesirable for obvious reasons. In such a situation, the length of the link 36 may be increased such that the non-buoyant load 34 sinks below the loose sediment and the framework 12 floats a desired amount above the loose sediment. Similarly, the length of the link 36 may be set to correspond to a desired height such that the framework 12 floats at a position frequently by a desired fish species, such as near the bottom of the body of water, near the top of the body of water, etc.

Additionally, the separation provided by coupling the framework 12 with the non-buoyant load 34 through the link 36 allows the framework 12 to float in a desired substantially upright position relative to the surface of the water, even in situations when the bottom of the body of the water is substantially uneven. It is desirable to position the framework 12 in a substantially upright position to allow a hook to enter the passageway 26 along a path substantially perpendicular to the surface of the water and to allow a fish to be reeled out of the passageway along the same path, as individuals may sometimes fish from directly above the habitat 10. This desirable position is achieved regardless of the slope of the bottom of the body of water. For instance, the non-buoyant load 34 may be placed on a sloped lake bottom and the framework 12 will float upright due to the link 36 which always perpendicularly extends towards to the surface of the water due to the buoyancy of the framework 12.

The layers 14, supporting member 16, periphery sections 18, coupling member 30, and mounting elements 32 may be joined together or otherwise coupled through conventional elements, such as the PVC joint connectors 24. In the illustrated habitat 10, the layers 14, supporting member 16, periphery sections 18, coupling member 30, and mounting elements 32 are permanently coupled together, such as with glue or the like. However, these components may be removably coupled together such that the habitat 10 may be disassembled for easy transport and storage. Additionally, by removably coupling the various elements of the habitat 10, the habitat 10 may be easily modified by the addition or removal of layers 14, supporting members 16, periphery sections 18, coupling members 30, and mounting elements 32. For example, the first preferred embodiment may be easily modified or reconfigured to conform to other preferred embodiments described below. However, if one or more components of the habitat 10 are removably coupled together, it is important that such coupling does not compromise the buoyancy of the framework 12.

In operation, an individual transports the habitat 10 to a desired fishing location such as a location in proximity to a dock, as illustrated in FIG. 1. The habitat 10 may be pre-assembled, such that the individual is not required to assemble the habitat 10 into a desired configuration, or the individual may assemble the habitat 10 by coupling the layers 14, supporting member 16, periphery sections 18, coupling members 30, and mounting elements 32 into a desired configuration. Additionally, the individual preferably selects a desired size for the habitat 10, by selecting the size of the material relative to the size of a desired fish hook, to allow snag-free fishing with the desired fish hook size. For instance, as described above, the individual may select half-inch PVC tubing for fishing with a #3 hook.

The individual couples the non-buoyant load 34 to at least one mounting element 32 by coupling the non-buoyant load 34 and mounting element 32 with the link 36 as described above. The length of the link 36 may be modified by the individual based on the requirements of the body of water, such as the slope of the bottom of the body of water or the amount of loose sediment present, as also described above. The individual then submerges the habitat 10, including the non-buoyant load 34, in the body of water, by dropping the habitat 10 off a boat or a dock, or using other similar methods. The non-buoyant load 34 sinks to the bottom of the body of water and the framework 12 floats above the load 34 at the desired position.

Once in position, the individual may immediately begin to fish. However, it will be appreciated that fish will generally take some time to begin to reside within the habitat 10. For instance, it may take a few days, or even a few weeks, based on various environmental concerns, for fish to adjust to the change in their environment and for a significant amount of fish to reside within the habitat 10. Additionally, the habitat 10 will eventually become covered with algae and other aquatic life, which provides the habitat 10 with a natural appearance which may be more appealing to fish.

To fish in and around the habitat 10, the individual descends a fishing instrument, such as the desired fish hook which corresponds to the material size, as described above, into the habitat 10. Obviously, the individual may utilize other fishing instruments, such as lures having a specific gap spacing, in place of or in addition to the conventional fish hook. The individual lowers the fish hook into the framework 12 through the open portion 20 of any layer 14*a–d* and into the passageway 26, or through the spacing 28*a–d* and into the passageway 26. As shown in FIG. 1, the individual may lower the fish hook through the entire passageway 26 and through each open portion 20 such that the fish hook concurrently passes through the open portion 20 of each layer 14. Upon insertion of the fish hook within the habitat 10, the individual may fish utilizing conventional tactics or methods. Additionally, multiple individuals may simultaneously fish within the habitat 10.

In fortunate situations where the individual is able to hook a fish, the fish-laden hook may be withdrawn from the habitat 10 through the passageway 26, open portions 20, or spacing 28, without fear of losing the fish from the hook snagging on the framework 12 due to the minimum cross section of the material, as described above. Similarly, in even more fortunate situations where the individual is able to hook a very large fish, the fish-laden hook may be withdrawn from the habitat 10 without risk of losing the fish from a fish-line break, as the floating framework 12 is operable to move laterally when external force is applied due to the separation provided by the link 36.

If the individual desires to remove the habitat 10 from the body of water, the individual may grip the proximate mounting element 32*a* and easily pull the habitat 10 out of the water. Thus, the individual may easily remove the habitat 10 without being required to dig the habitat 10 out of the bottom of the body of water. Similarly, once positioned, the individual may easily move the habitat 10 to another position by gripping the proximate mounting element 32*a* and lifting, pulling, or dragging the habitat 10 to the desired position.

Turning now to FIGS. 6–10, a second preferred embodiment of the present invention is shown comprising a habitat 100 having an open framework 102 including a plurality of layers 104*a–e*. The habitat 100 is substantially similar to the habitat 10, with the primary exception that the layers 104*a–e* are substantially larger than the layers 14*a–e* and are elongated octagons in shape and the framework 102 includes three supporting members 106 to support the larger layers 104*a–e*, including a center member 106*a* and a pair of spaced side members 106*b* and 106*c*. In this regard, the framework 102 includes corresponding cross members coupled to each of the side members 106*b*, 106*c*, as well as cross members coupling the side members 106*b*, 106*c* to the center member 106*a*. Additionally, the habitat 100 includes two distal mounting elements 108*a* and 108*b* for coupling with a pair of non-buoyant loads 110*a* and 110*b*, respectively, in a substantially similar manner to the habitat 10.

Figure 12:
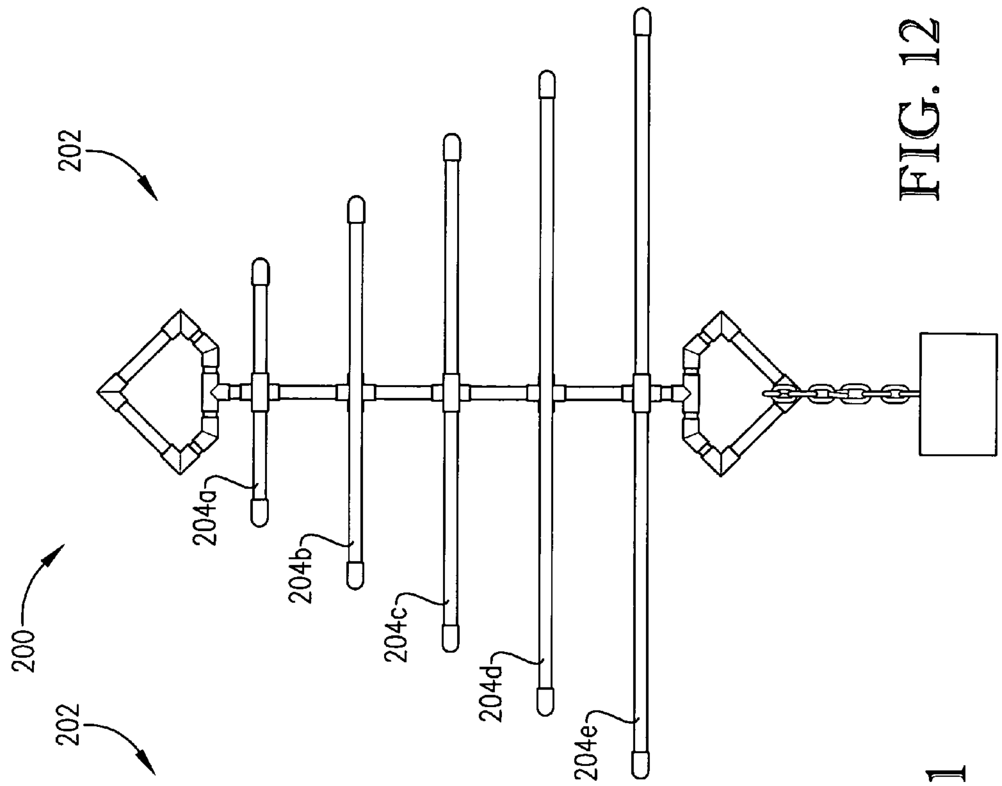
FIG. 12 is a front elevational view of the artificial fish habitat illustrated in FIG. 11.
Figure 11:
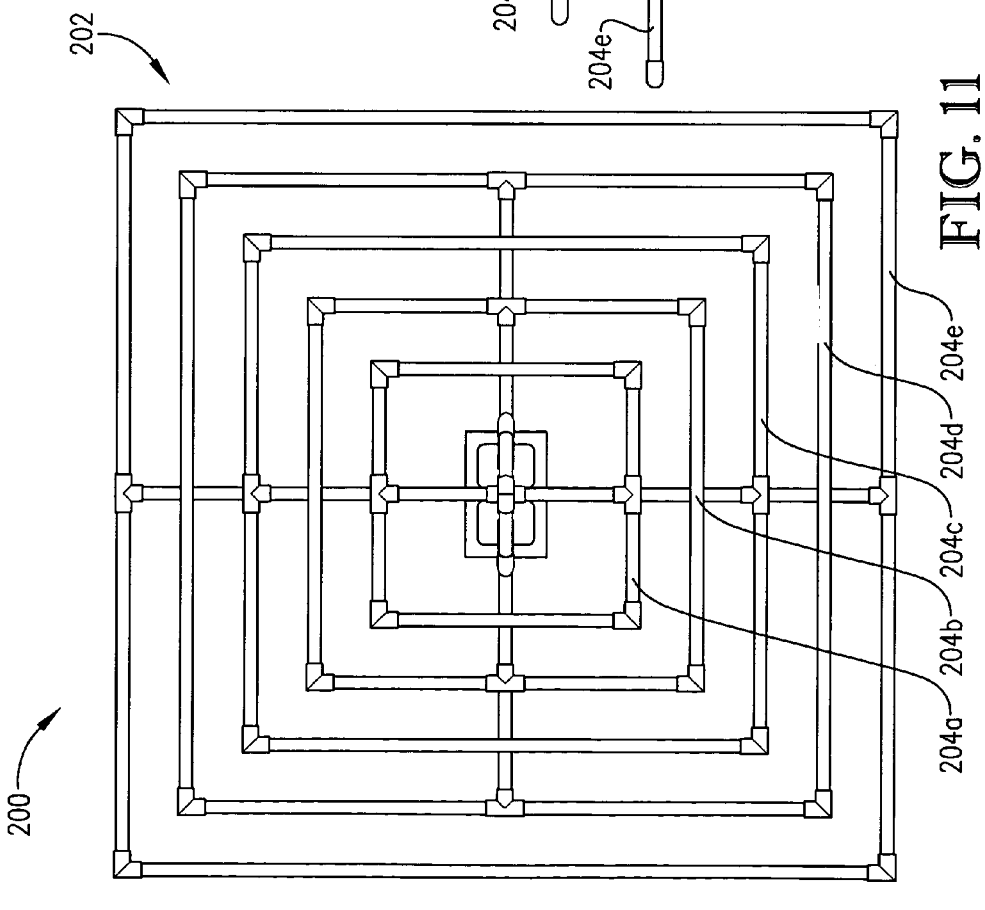
FIG. 11 is a top view of an artificial fish habitat constructed in accordance with the principals of a third preferred embodiment of the present invention.

Turning now to FIGS. 11–12, a third preferred embodiment of the present invention is shown comprising a habitat 200 having an open framework 202 including a plurality of layers 204*a–e*. The habitat 200 is substantially similar to the habitat 10 with the exception that the layers 204*a–e* each present a substantially square configuration.

Figure 14:
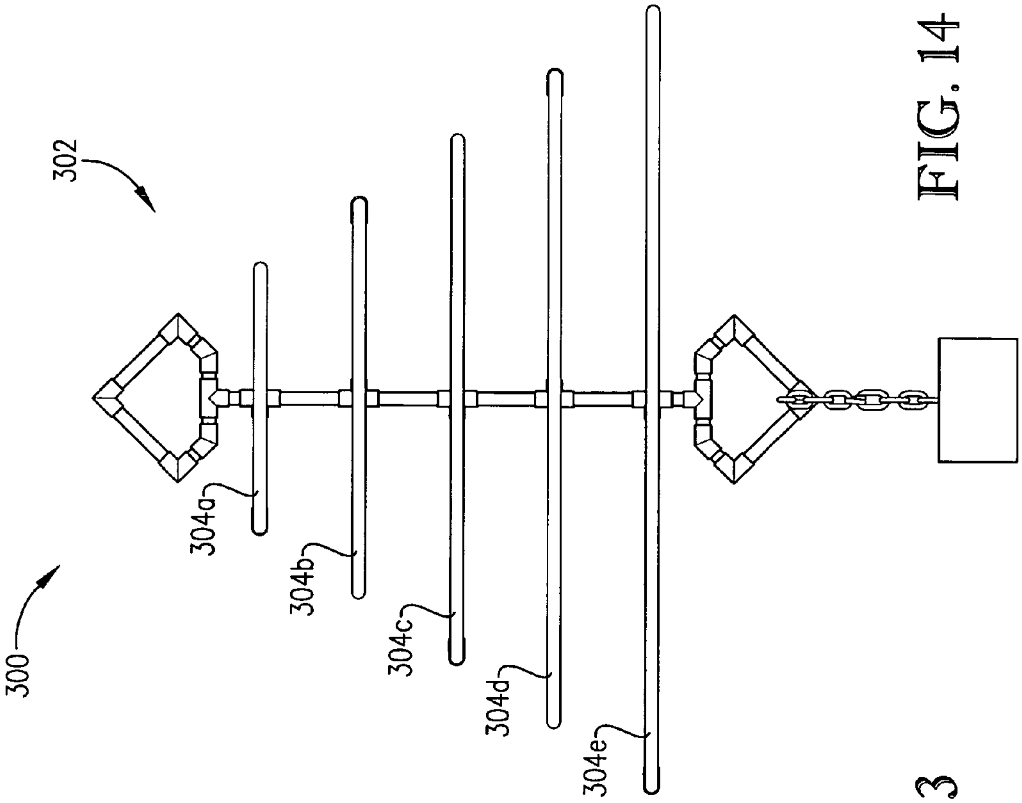
FIG. 14 is a front elevational view of the artificial fish habitat illustrated in FIG. 13.
Figure 13:
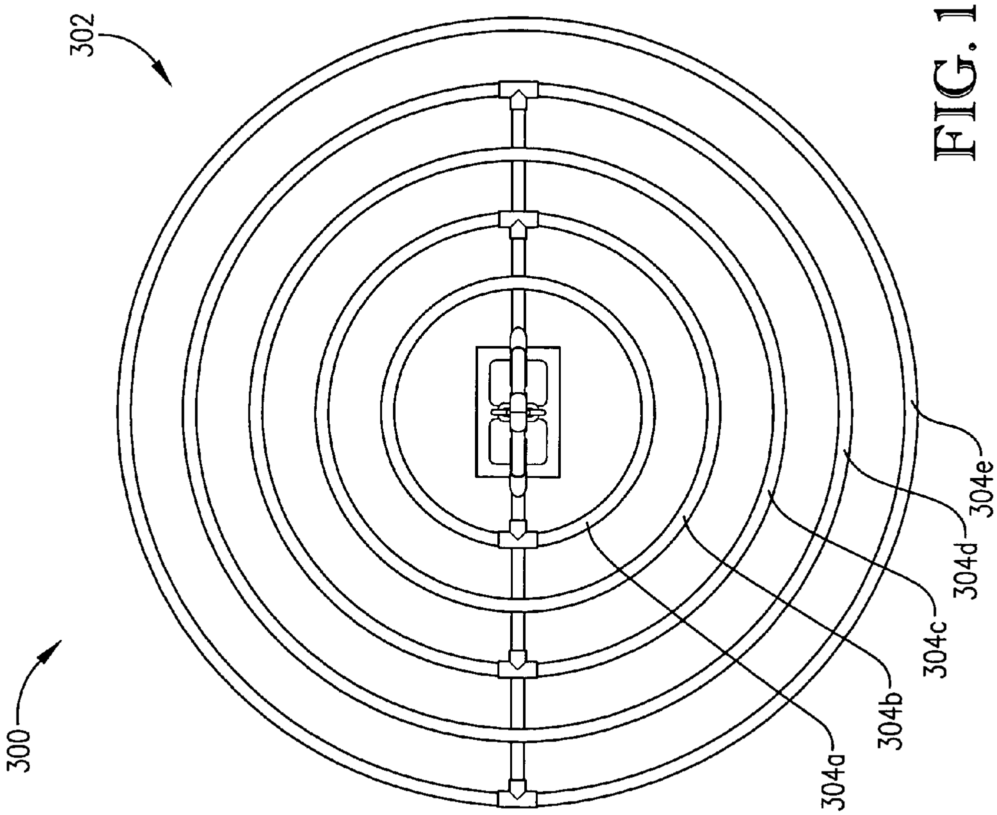
FIG. 13 is a top view of an artificial fish habitat constructed in accordance with the principals of a fourth preferred embodiment of the present invention.

Turning now to FIGS. 13–14, a fourth preferred embodiment of the present invention is shown comprising a habitat 300 having an open framework 302 including a plurality of layers 304*a–e*. The habitat 300 is substantially similar to the habitat 10 with the exception that the layers 304*a–e* each present a substantially circular configuration.

Figure 15:
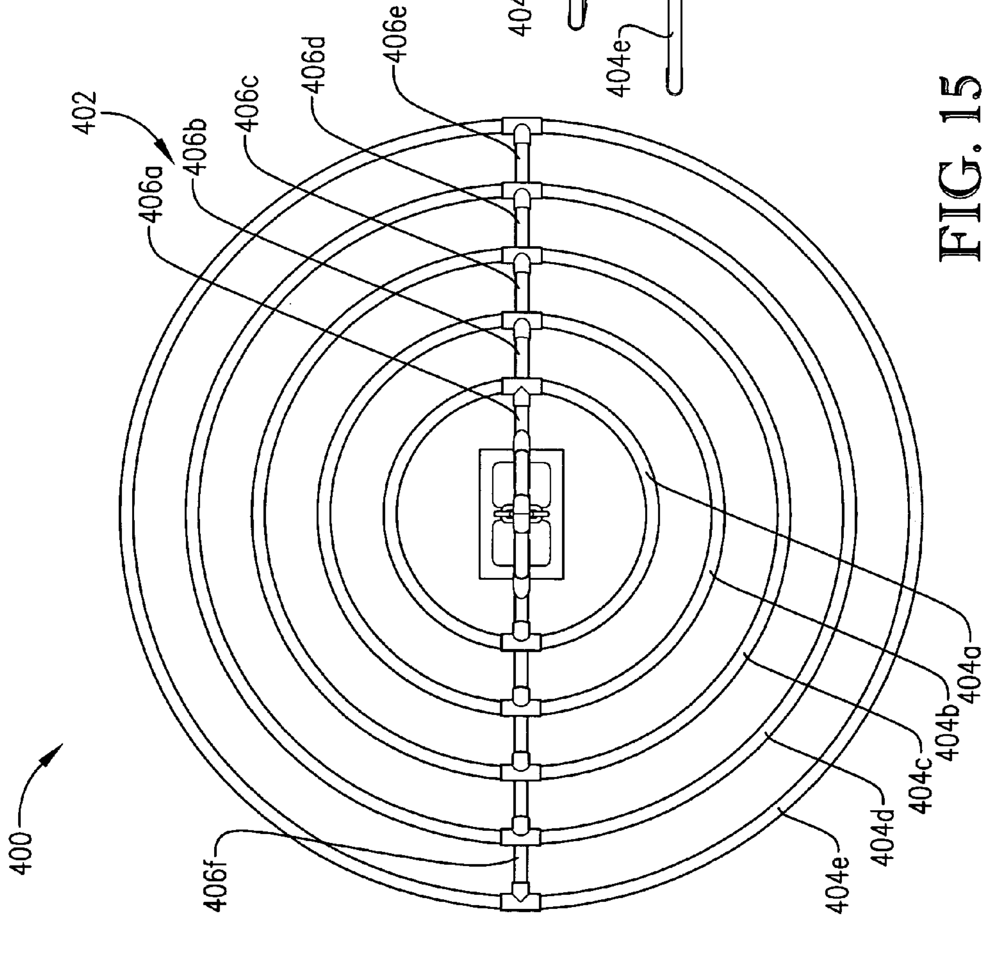
FIG. 15 is a top view of an artificial fish habitat constructed in accordance with the principals of a fifth preferred embodiment of the present invention.
Figure 16:
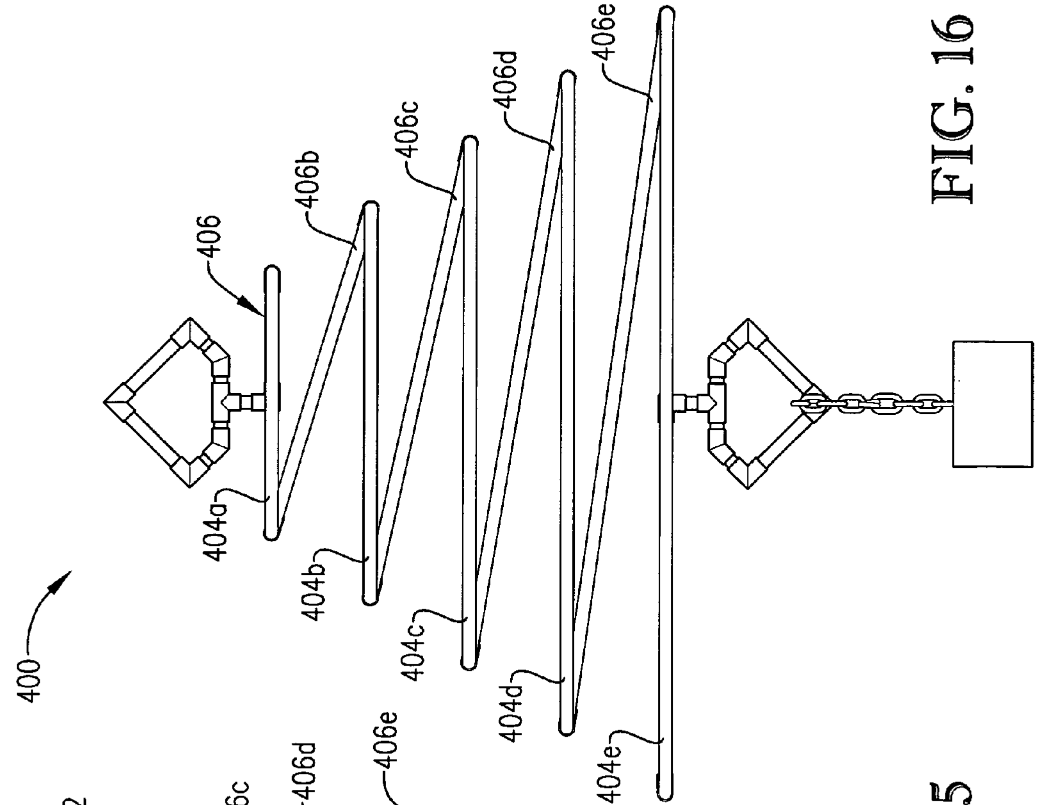
FIG. 16 is a front elevational view of the artificial fish habitat illustrated in FIG. 15.

Turning now to FIGS. 15–16, a fifth preferred embodiment of the present invention is shown comprising a habitat 400 having an open framework 402 including a plurality of layers 404*a–e*. The habitat 400 is substantially similar to the habitat 10 with the exception that the layers 404*a–e* present a substantially circular shape and each of the layers 404*a–e* are generally formed from a continuous periphery section 406. In this regard, each of the sections 406 may be formed from a continuous flexible tubing without the need for connectors. The continuous periphery sections 406 may be held in position by a plurality of retaining members 406*a–e* and may be comprised of a plurality of tube sections, such as sections of conventional flexible PVC tubing. Additionally, the framework 402 does not include a supporting member as structural strength and support is provided by the retaining members 406*a–e*, however, one or more vertical support members could be utilized. The flexible material also enables the habitat 400 to be easily transported and stored. Additionally, the retaining members 406*a–e* could be removably coupled to the periphery sections 406 to enable compacting the framework 402 such that all layers 404*a–e* fit within the same horizontal plane for storage.

Figure 18:
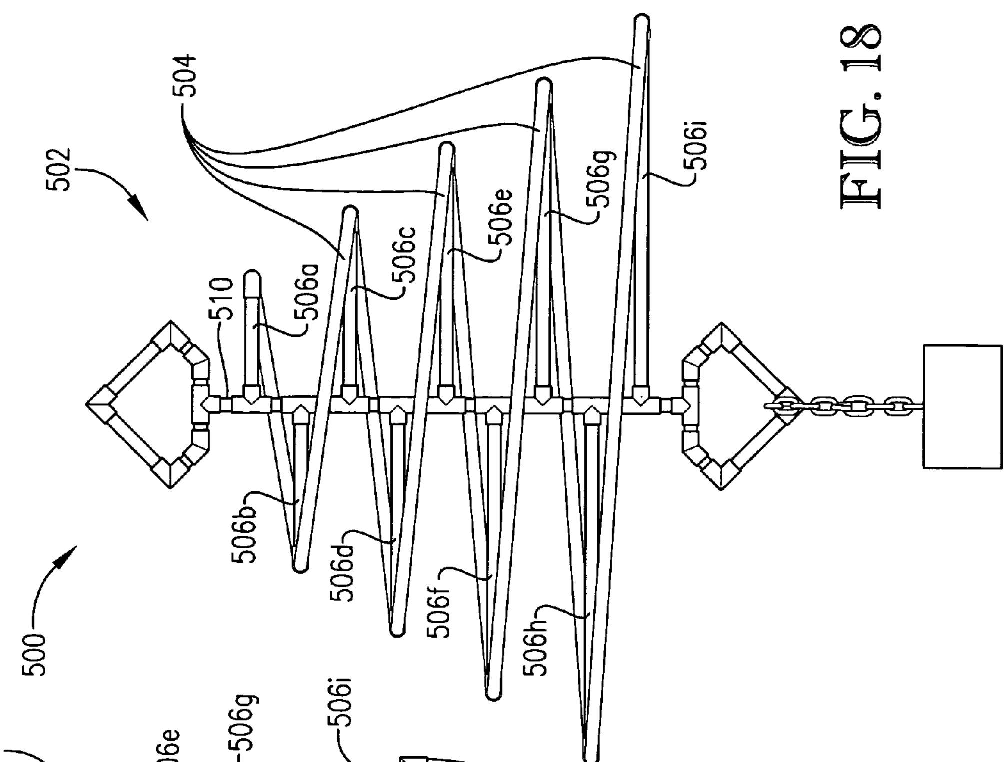
FIG. 18 is a front elevational view of the artificial fish habitat illustrated in FIG. 17.
Figure 17:
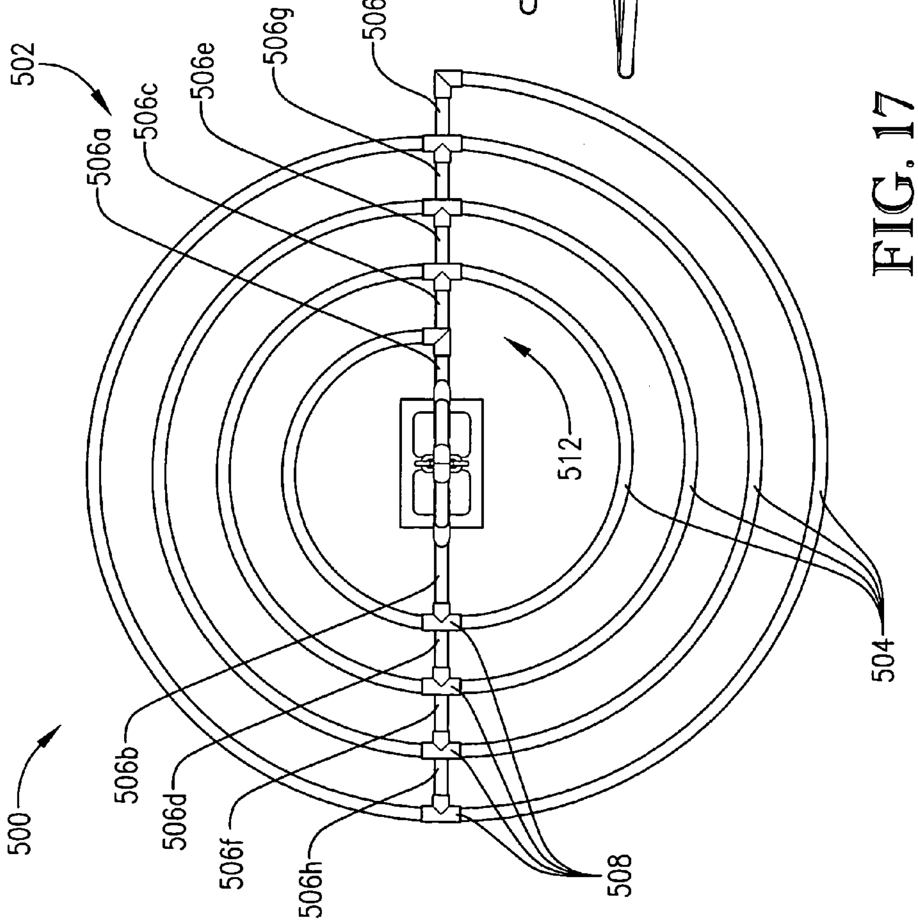
FIG. 17 is a top view of an artificial fish habitat constructed in accordance with the principals of a sixth preferred embodiment of the present invention.

Turning now to FIGS. 17–18, a sixth preferred embodiment of the present invention is shown comprising a habitat 500 having an open framework 502 including a plurality of layers 504. The layers 504 present a substantially circular shape and all layers 504 are generally formed from a single continuous periphery section 506. The continuous periphery section 506 provides the framework 502 with a substantially spiral shape. The continuous periphery section 506 is held in position by a plurality of cross members 506*a*-I coupled thereto with connectors 508. The cross members 506*a*-I are also coupled to a supporting member 510 which is generally coaxial with a passageway 512. The continuous preiphery section 506 is preferably formed from a flexible material, such as conventional flexible plastic tubing, to enable an easy construction and assembly of the habitat 10. The supporting member 510 is substantially similar to the supporting member 16.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. An artificial fish habitat for placement in a body of water and fishing in and around with a hook having a gap spacing, said habitat comprising:

an open framework including a plurality of layers and at least one supporting member extending generally transverse to at least one of said layers, each of said layers including an elongated periphery section generally defining an internal substantially open portion adapted for fish to pass through, at least a portion of each of said layers being spaced from one another and generally aligned so that said open portions cooperate to define a passageway through the framework and extending generally transverse to said layers, and said open framework being substantially formed from a material presenting a minimum edgeless cross section sized and configured to be greater than the gap spacing of the hook.

2. The fish habitat as claimed in claim 1, said material being buoyant such that the framework is operable to float in the body of water.

3. The fish habitat as claimed in claim 2; and a non-buoyant load coupled to the framework so that when the habitat is placed in the body of water, the framework is submerged within the body of water but floats above the bottom thereof.

4. The fish habitat as claimed in claim 2, said material comprising tubing, said edgeless cross section being generally round in configuration, said tubing being substantially sealed to thereby provide the material's buoyancy.

5. The fish habitat as claimed in claim 4, said tubing including a plurality of interconnected tube sections.

6. The fish habitat as claimed in claim 5, said tubing being formed in major portion of PVC.

7. The fish habitat as claimed in claim 1, all of said periphery sections being substantially defined by a continuous elongated element.

8. The fish habitat as claimed in claim 1, said passageway being substantially vertical relative to the surface of the body of water when the habitat is placed therein.

9. The fish habitat as claimed in claim 8, said layers being vertically spaced from one another.

10. The fish habitat as claimed in claim 9, said layers being sufficiently spaced from one another such that fish may pass there between.

11. The fish habitat as claimed in claim 8, said open portions being substantially aligned so that the passageway is adapted for fish to pass through.

12. The fish habitat as claimed in claim 1, each of said layers presenting a diameter, said diameters varying in dimension.

13. The fish habitat as claimed in claim 12, said layers being spaced from one another and generally concentrically aligned from smallest diameter to largest such that the habitat presents a generally pyramidal shape, said diameters varying sufficiently in dimension so that at least a portion of each of said internal substantially open portions extends horizontally beyond the outer margin of the previous adjacent layer, said at least a portion of each of said internal substantially open portions being adapted for fish to pass through.

14. The fish habitat as claimed in claim 1, each of said layers presenting a common generally uniform shape.

15. The fish habitat as claimed in claim 14, said shape being a circle.

16. The fish habitat as claimed in claim 14, said shape being polygonal.

17. The fish habitat as claimed in claim 16, said shape being an octagon.

18. The fish habitat as claimed in claim 1, said supporting member being elongated and rigid and extending generally parallel to said passageway, each of said layers being coupled to said supporting member.

19. The fish habitat as claimed in claim 18, said supporting member and said passageway being generally coaxial.

* * * * *